May 30, 1933.  A. E. BARTZ  1,911,787

CARBURETOR HEAT CONTROL

Filed April 23, 1931

Inventor:
Arthur E. Bartz
By MacLeod, Calver, Copeland & Dike
Attorneys.

May 30, 1933.   A. E. BARTZ   1,911,787
CARBURETOR HEAT CONTROL
Filed April 23, 1931   3 Sheets-Sheet 2
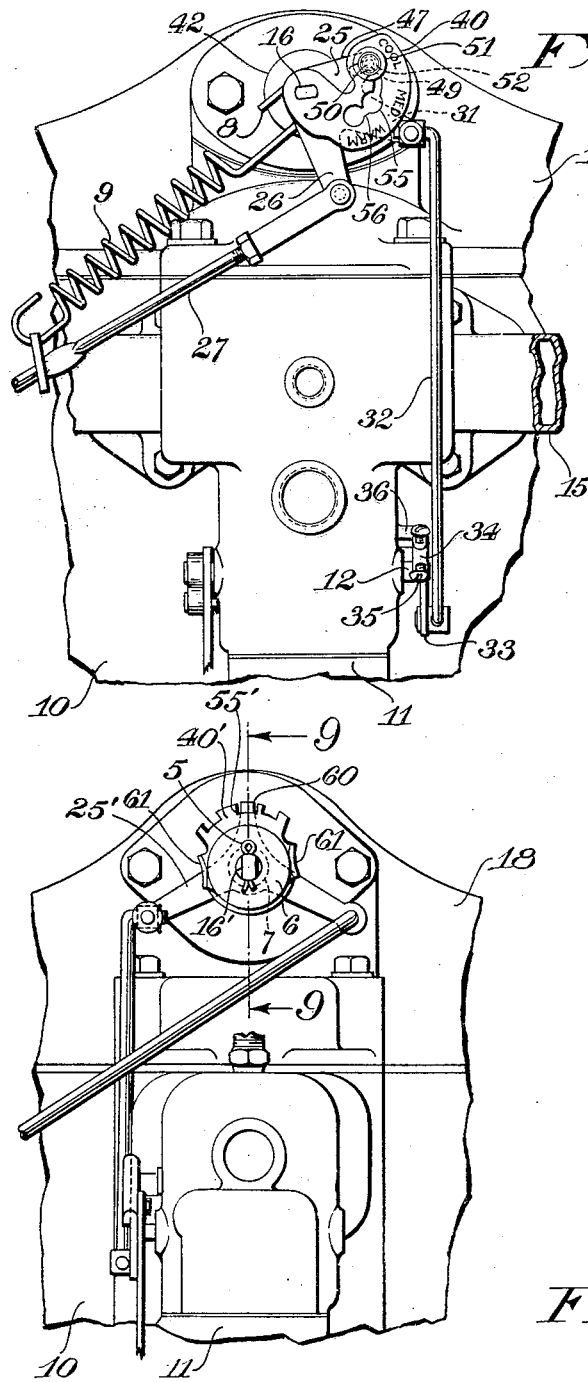
Fig. 4
Fig. 7
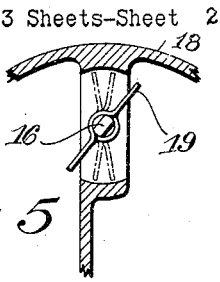
Fig. 5
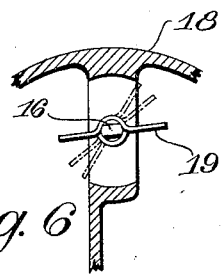
Fig. 6
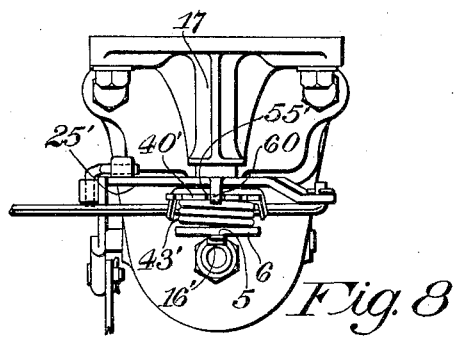
Fig. 8
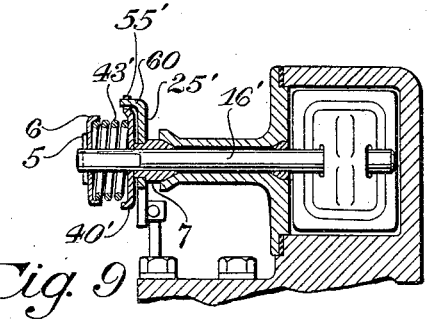
Fig. 9
Inventor:
Arthur E. Bartz
By McLeod, Calver, Copeland & Diko
Attorneys

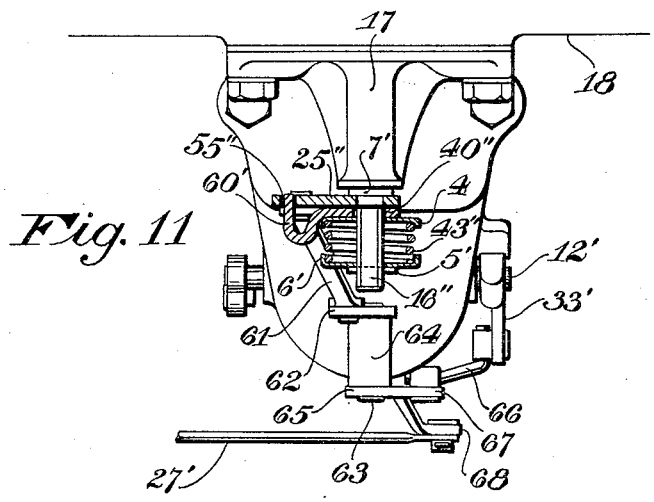
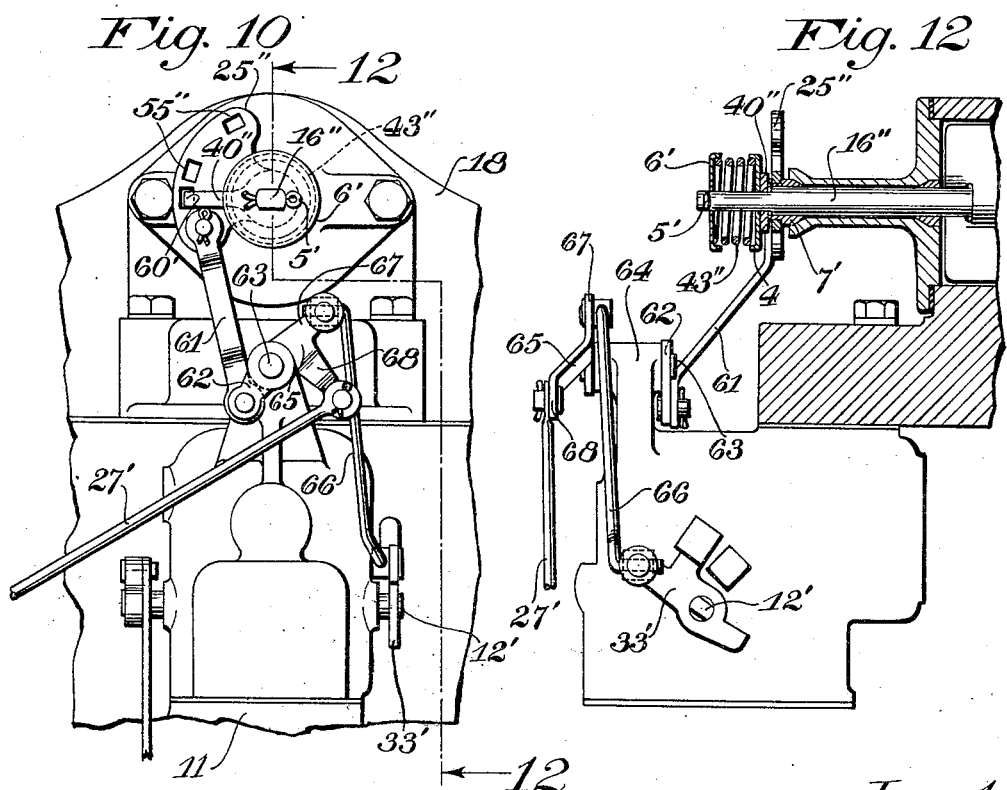

Patented May 30, 1933

1,911,787

UNITED STATES PATENT OFFICE

ARTHUR E. BARTZ, OF DETROIT, MICHIGAN, ASSIGNOR TO HUDSON MOTOR CAR COMPANY, OF DETROIT, MICHIGAN, A CORPORATION OF MICHIGAN

CARBURETOR HEAT CONTROL

Application filed April 23, 1931. Serial No. 532,181.

This invention relates to heat controls in which an obstruction is adjustably mounted in the exhaust manifold for deflecting the exhaust gases from one or more of the cylinders of an internal combustion engine around the riser of the carburetor to effect a more efficient carburization. In such devices, the obstruction is connected with the throttle actuating mechanism so as to be operated thereby to vary with the speed of the engine the volume of hot gases flowing around the carburetor riser.

It is the object of the present invention to provide means for simplifying the construction of the connection between a heat control of the general type above described and the throttle operating mechanism.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

The invention will be more clearly understood from the following description in connection with the accompanying drawings: in which, Fig. 1 is an elevational view of an internal combustion engine embodying the invention;

Fig. 4 is a view similar to Fig. 2 showing the parts in different position;

Fig. 5 is a detail sectional view with the parts in the same position as in Fig. 2;

Fig. 6 is a detail sectional view with the parts in the same position as in Fig. 4;

Fig. 7 is a view similar to Fig. 2 showing a modified construction;

Fig. 8 is a plan view of a portion of the mechanism shown in Fig. 7;

Fig. 9 is a sectional view taken upon the line 9—9 of Fig. 7;

Fig. 10 is a view similar to Fig. 2 showing another modified construction;

Fig. 11 is a plan view partly in section of the portion of the mechanism shown in Fig. 10;

Fig. 12 is a sectional view taken upon the line 12—12 of Fig. 10.

Figures 2, 3:
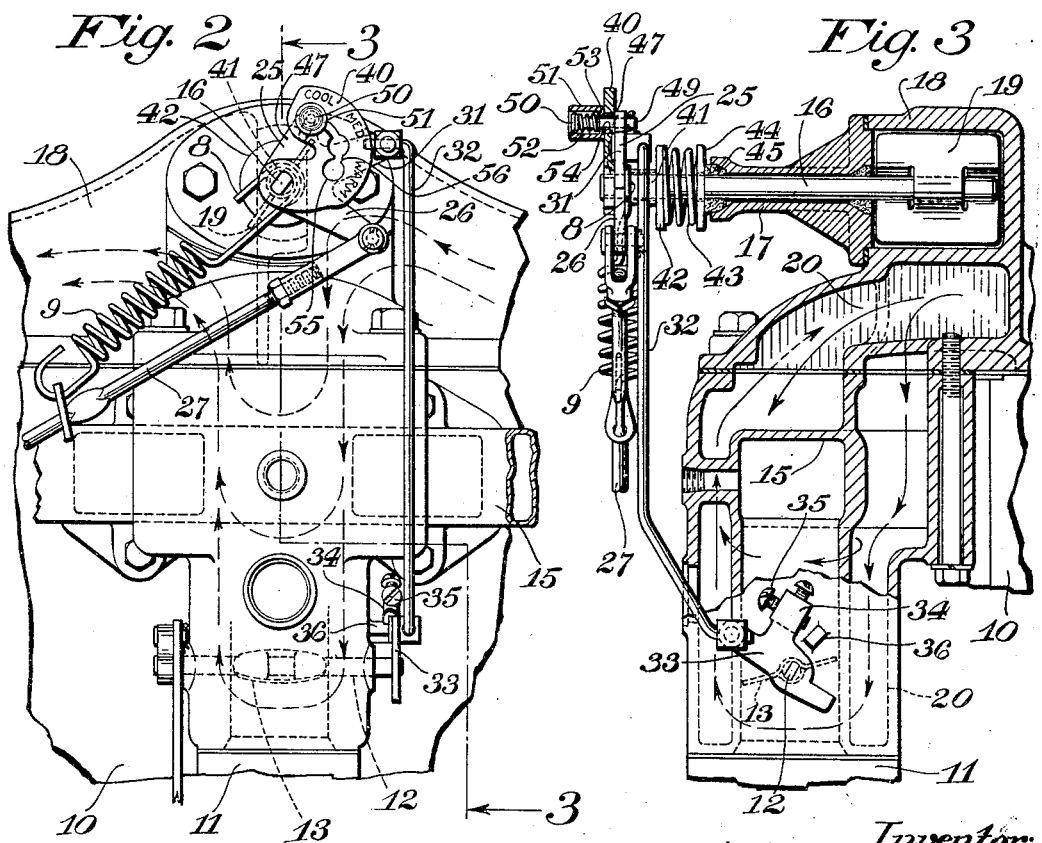
Fig. 2 is an enlarged fragmentary view of a portion of the mechanism shown in Fig. 1.
Fig. 3 is a sectional view taken upon the line 3—3 of Fig. 2.

In the accompanying drawings there is illustrated an internal combustion engine 10 having a carburetor 11 in which is rotatably mounted a shaft 12 carrying a throttle valve 13 adapted to control the flow of mixture into an intake manifold 15. A shaft 16 is rotatably mounted in a suitable bearing 17 extending from one wall of the exhaust manifold 18. The shaft 16 extends into the exhaust manifold and has secured thereon a damper 19 adapted to deflect the gases in the exhaust manifold down through the passages 20 around the riser of the carburetor as indicated by the arrows in Figs. 2 and 3.

A plate 25 is rotatably mounted on the shaft 16 outside the manifold 18 and is provided with an arm 26 to the end of which one end of a rod 27 is pivotally connected. The other end of the rod 27 is pivotally connected to the free end of an arm 28 fixed upon a shaft 29 suitably mounted for rotation in bearings (not shown) carried by the vehicle chassis. A foot throttle 30 is fixed upon the shaft 29. A spring 9 is secured at one end to the rod 27 and its other end is provided with a hook 8 surrounding the shaft 16. The plate 25 is provided with an arm 31 to the end of which one end of the rod 32 is pivotally connected. The other end of the rod 32 is pivotally connected to one end of a lever 33 fixed upon the shaft 12. The lever 33 is provided with a boss 34 which carries an adjusting screw 35 adapted to engage a stop 36 upon the body of the carburetor.

A plate 40 is fixed upon the shaft 16 adjacent one face of the plate 25. A sleeve 41 extends from the other face of the plate 25 and surrounds the shaft 16. A washer 42 surrounding the shaft 16 is held against the free end of the sleeve 41 by a spring 43 extending between washer 42 and a washer 44 engaging packing 45 positioned between the shaft 16 and bearing 17. An arm 47 on the plate 25 carries a rod 49 which extends through a passage formed by the openings 55 and arcuate slots 56 in the plate 40. The free end of the rod 49 is provided with a head 50 positioned within a hollow button 51. The button 51 is provided with a reduced portion 54 adapted to be received in any one of the openings 55 in the plate 40. A spring 52 surrounds the rod 49 with one end engaging the head 50 and its other end engaging a shoulder 53 within the button 51.

Figure 1:
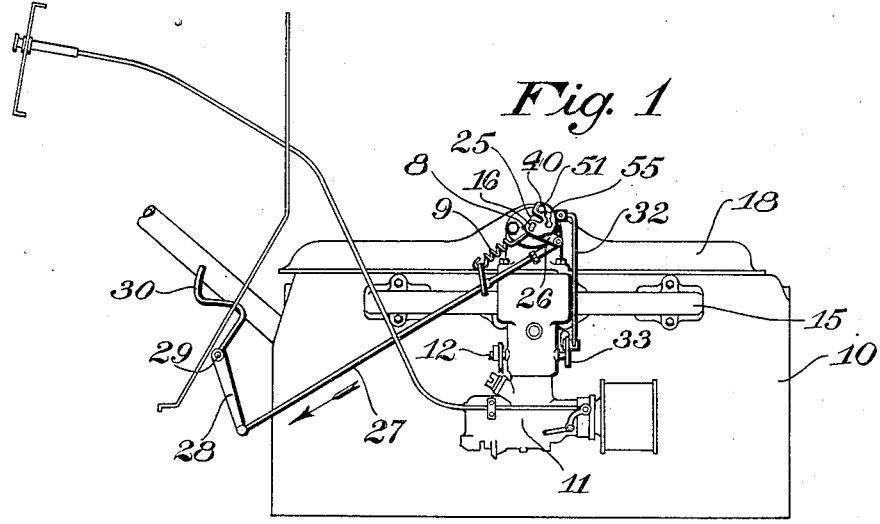

When the foot throttle 30 is depressed to actuate the throttle valve 13, the rod 27 is moved in the direction as indicated by the arrow in Fig. 1 causing the plates 25 and 40 to rotate with the shaft 16 to actuate the damper 19. The amount that the damper 19 opens when the foot throttle 30 is depressed is regulated by the relative positions of the plates 25 and 40. If the engine is operating where the surrounding temperature is very high the plates 25 and 40 are fixed in the relative position shown in Figs. 2 and 4. If the temperature conditions of the surrounding atmosphere change the button 51 is pulled out to remove the reduced portion 54 from the opening 55 in which it rests so as to permit the rod 49 to be moved through the slots 56 into one of the other openings 55. The rod 49 is locked in this new position by releasing the button 51 to cause the spring 52 to push the reduced portion 54 into the other opening 55.

In the modified construction shown in Figs. 7, 8 and 9 the plate 25' is rotatably mounted upon a bushing 7 surrounding the shaft 16'. The plate 40' is keyed upon the shaft 16' so as to rotate therewith and is pressed towards the plate 25' by the spring 43' extending between the same and a washer 6 held upon the shaft 16' by a pin 5. The plate 25' is provided with an outwardly extending finger 60 adapted to be received in any one of the openings 55' in the plate 40'. The plate 40' is provided with ears 61 by which it may be gripped and moved to bring the finger 60 into engagement with any one of the other openings 55' in the plate 40' to thereby change the relative position of the plates 40' and 25'.

In the modified construction shown in Figs. 10, 11 and 12, the plate 25'' is rotatably mounted upon a bushing 7', an arm 40'' is keyed on the shaft 16'' and is held against the end of the bushing 7' by a spring 43'' extending between washers 4 and 6'. The plate 40'' is provided with a finger 60' adapted to be received in any one of the openings 55'' in the plate 25''. One end of an arm 61 is pivotally connected to the plate 25'' and its other end is pivotally connected to an arm 62 fixed upon one end of a shaft 63 rotatably mounted in suitable bearings carried in a boss 64 on the carburetor casing. A bell crank 65 is fixed upon the other end of the shaft 63. One end of a rod 66 is pivotally connected to an arm 67 of the bell crank 65 and its other end is pivotally connected to the lever 33' carried upon the throttle valve shaft 12'. The rod 27' is pivotally connected at one end to the arm 68 of the bell crank 65.

What I claim is:

1. In a heat control for internal combustion engines having a throttle valve, a rotatable shaft carrying a damper for controlling the flow of gases in the exhaust manifold, and means for operatively connecting said shaft and throttle, the combination therewith of means for adjusting the connection between said shaft and throttle comprising a pair of plates mounted on said shaft, one of said plates being fixed to said shaft, and means for adjustably connecting said plates.

2. In a heat control for internal combustion engines, having a throttle valve, a rotatable shaft carrying a damper for controlling the flow of gases in the exhaust manifold, and means for operatively connecting said shaft and throttle, the combination therewith of means for adjusting the connection between said shaft and throttle comprising a pair of plates mounted on said shaft, one of said plates being fixed to said shaft, resilient means urging said plates toward one another, and means for adjustably connecting said plates.

3. In a heat control for internal combustion engines having a throttle valve, a rotatable shaft carrying a damper for controlling the flow of gases in the exhaust manifold, and means for operatively connecting said shaft and throttle, the combination therewith of means for adjusting the connection between said shaft and throttle comprising a pair of plates mounted on said shaft, one of said plates being fixed to said shaft, means for adjustably positioning said plates, and resilient means permitting said adjustment.

In testimony whereof I affix my signature.

ARTHUR E. BARTZ.